(No Model.)
W. STANLEY, Jr., & J. F. KELLY.
ALTERNATING CURRENT MOTOR.
No. 455,773. Patented July 14, 1891.
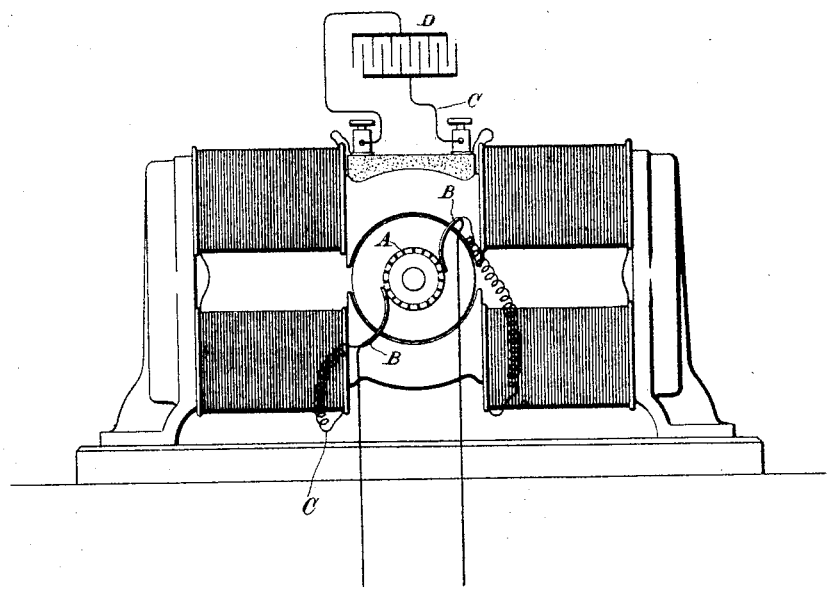
Witnesses:
Raphaël Netter
Ernest Hopkinson
Inventors
William Stanley Jr
and John F. Kelly
by
Duncan & Page,
Attorneys.

UNITED STATES PATENT OFFICE.

WILLIAM STANLEY, JR., OF PITTSFIELD, MASSACHUSETTS, AND JOHN F. KELLY, OF NEW YORK, N. Y.

ALTERNATING-CURRENT MOTOR.

SPECIFICATION forming part of Letters Patent No. 455,773, dated July 14, 1891.

Application filed April 10, 1891. Serial No. 388,403. (No model.)

*To all whom it may concern:*

Be it known that we, WILLIAM STANLEY, Jr., of Pittsfield, in the county of Berkshire and State of Massachusetts, and JOHN F. KELLY, of New York, in the county and State of New York, both citizens of the United States, have invented certain new and useful Improvements in Alternating - Current Motors, of which the following is a specification, reference being had to the drawing accompanying and forming a part of the same.

The object of this invention is to render practicable and efficient the operation of an electro-magnetic motor of ordinary type by an alternating current, so that the motor may have the full capability of starting and regulation common to the corresponding forms of direct or continuous current motors.

The particular form of motor to which the invention applies is that known as a "shunt-wound continuous-current motor;" or, generally speaking, the invention is applicable to any motor having a commutator and a field-circuit in derivation or shunt to its armature-circuit.

The invention is based on the well-known property or feature possessed by a condenser of neutralizing or counteracting the effects of the self-induction of a circuit with which it may be connected; and it consists in the combination, with a motor of the kind described, of a condenser included in the field-circuit or that circuit having the higher self-induction.

If a motor of the kind described be operated by an alternating current, a loss is occasioned by the high self-induction of the field-circuit, which retards the phase of the current-imparting magnetism to the field-magnets, and as a consequence the maximum magnetic effects of armature and field are not coincident, a condition which impairs the efficiency of the motor. In order to counteract this and to bring the maximum magnetic conditions of the two elements, armature and field, more nearly into coincidence, we introduce into the field-circuit a condenser, which has the effect of bringing the phase therein nearer to that of the impressed electro-motive force of the source of current. The efficiency and economy of this disposition will, of course, depend upon the electro-motive force, rate of change of the current, and other well-understood conditions; but these are matters which are now well understood.

In practice the motor will be adapted in other well-known respects than those herein specified for use or operation with a source of alternating currents. For example, the cores of the field-magnets should be magnetically subdivided or laminated.

We have shown in the drawing an ordinary form of shunt-wound motor having a commutator A, brushes B B, a field-circuit C, and a condenser D included in the field-circuit.

We do not claim, broadly, the combination of a condenser with a circuit of alternating currents for the purpose of counteracting the retardation due to self-induction; but

What we claim is—

1. The combination, with an electro-magnetic motor provided with a commutator and having its field and armature circuits in derivation, of a condenser included in the circuit having the higher self-induction, as and for the purpose set forth.

2. In an electro-magnetic motor, the combination, with a rotary armature and commutator, of a field-magnet and energizing-circuit therefor in shunt or derivation to the armature - circuit, and a condenser included in said field-circuit, as herein set forth.

WILLIAM STANLEY, JR.
JOHN F. KELLY.

Witnesses as to William Stanley, Jr.:
    HENRY J. RYAN,
    PARKER W. PAGE.

Witnesses as to John F. Kelly:
    MOSES J. DERBITT,
    CHAS. E. BALDWIN.